US012665102B2

(12) United States Patent
McDonald

(10) Patent No.: US 12,665,102 B2
(45) Date of Patent: Jun. 23, 2026

(54) METHOD AND APPARATUS FOR COMPONENTS WITH A REDUCED AVERAGE ROUGHNESS

(71) Applicant: Atlas Magnetics, Reno, NV (US)

(72) Inventor: John Othniel McDonald, Reno, NV (US)

( * ) Notice: Subject to any disclaimer, the term of this patent is extended or adjusted under 35 U.S.C. 154(b) by 14 days.

(21) Appl. No.: 18/220,756

(22) Filed: Jul. 11, 2023

(65) Prior Publication Data

US 2024/0011181 A1 Jan. 11, 2024

Related U.S. Application Data

(63) Continuation of application No. 18/135,660, filed on Apr. 17, 2023, and a continuation of application No. 18/131,350, filed on Apr. 5, 2023.

(60) Provisional application No. 63/359,918, filed on Jul. 11, 2022.

(51) Int. Cl.
*H01B 1/16* (2006.01)

(52) U.S. Cl.
CPC .................................... *H01B 1/16* (2013.01)

(58) Field of Classification Search
None
See application file for complete search history.

(56) References Cited

U.S. PATENT DOCUMENTS

2021/0063337 A1* 3/2021 Dong .................. G01N 27/122

FOREIGN PATENT DOCUMENTS

CN 110047977 A * 7/2019 ......... H01L 33/0079

OTHER PUBLICATIONS

Scholarly Community Encyclopedia, "Anodizing", Jan. 25, 2021, <https://encyclopedia.pub/entry/6730>, accessed Feb. 6, 2025. (Year: 2021).*

* cited by examiner

*Primary Examiner* — Xiaobei Wang

(57) ABSTRACT

In an exemplary embodiment of the present invention: A series of U-shaped nickel-iron components are plated onto a rough or roughened semiconductor package or printed circuit board material. The horizontal base of the U-shaped component has a surface roughness of the semiconductor package material. The vertical surfaces of the U-shape have a surface roughness derived from the dry film. The large smooth vertical surface allows the U-shaped nickel-iron components to have a low average roughness. The lowered average roughness reduces the path length the U-shaped nickel-iron components provide for magnetic flux while the roughness of the horizontal portion of the U-shape allows for increased mechanical bonding to occur.

9 Claims, 8 Drawing Sheets

METHOD AND APPARATUS FOR COMPONENTS WITH A REDUCED AVERAGE ROUGHNESS

BACKGROUND

The field of the invention relates to the use of a mechanical bond when bonding plastic to metals in integrated circuit components.

Plastics used in semiconductor manufacturing and packaging have relatively low surface energy compared to the other materials the plastics are to interact with as part of a chip. This comparatively low surface energy makes it hard to directly bond materials, including, for example, copper or nickel-iron, to the surface of the plastic.

One potential way to increase the surface energy available from plastic is to increase its surface area. The surface area of the plastic can be increased with a mechanical pretreatment of the plastic, such as sanding, sandblasting, or grinding the plastic. A mechanical pretreatment generates a roughened surface on the plastic that will allow for increased surface energy to become available to the system as well as a mechanical bond between the plastic and whatever is plated onto its surface. The mechanical bond occurs because the pretreatment will generate a rough surface with peaks, valleys, and overhangs in the plastic surface that will cause the plastic to physically interlock with material plated onto it. This interlocking helps to secure the plastic and plated material together. The mechanical bond is in addition to any chemical bond between the two materials. Thus, the mechanical pretreatment creates two major benefits 1) the increased surface energy and 2) the mechanical bonds from the roughened plastic surfaces.

However, as noted above, these benefits rely on a mechanical pretreatment that roughens the plastic surface. This becomes an issue when the material plated onto plastic is intended to serve as a pathway, especially for current and magnetic flux; for example, a metal plated onto a roughened plastic surface would follow the contours of the plastic surface and present a longer current or flux path than a straight line of metal would. This extended pathway increases the system's resistivity and thus reduces its performance. Therefore, to allow for the mechanical pretreatment of plastic to occur without affecting the performance of bonded metals, the roughness of the metal components must be reduced.

Therefore, a solution is needed to utilize mechanically pretreated plastic without performance loss due to the increase in pathway length caused by the associated increase in roughness.

BRIEF SUMMARY OF THE INVENTION

The present invention reduces or eliminates the negative effects of forming conductive or magnetic layers on base layers of, for example, epoxy plastics, in relation to surface roughness—allowing the surface of a base layer to even be intentionally roughened for increased mechanical bonding and available surface energy without a significant reduction in component performance.

These benefits are achieved by lowering the average roughness of the conductive or magnetic component through the utilization of component shapes with a method that is relatively low-cost to implement. The result is a component material layer stack, comprising, in at least one exemplary embodiment of at least one material with a U-shape cross-section, a portion of an outer surface of the U-shape material having a rough contour, and the rough contour surface of the u-shape material operably bonded to a roughened portion of a base layer. The u-shaped component can be encapsulated in semiconductor packaging to form a semiconductor packaging layer which can then be easily integrated into multi-layer packaging.

It will be appreciated that the outer surface portion of the U-shape, which has a rough contour, is typically the foundation of the U-shape, and it achieves its rough contour by following the contours of a roughened base onto which it is deposited and bound. However, the vertical sides of the U-shape, both the exterior and interior portions, do not typically follow a roughened contoured shape but take up the smoothness of the patterning material used to form the layers. These smooth and straight vertical sides reduce the average roughness of the u-shape component allowing for more efficient performance when compared to a component strictly following the contours of the roughened base. The U-shape provides greater surface area than a solid block shape and, therefore, has a stronger reduction in the average surface roughness of the component than a block of material.

The terms rough and smooth refer to the preparation of a surface, a surface that has been treated in some manner to produce a surface with less roughness than the initially occurring surface is smooth, while the unsmoothed surface is rough. For example, a semiconductor plastic base layer will initially have a surface roughness limited by the means of forming the layer, but the surface roughness may then be decreased by a smoothing process, for example, grinding or polishing. In a similar vein, when a surface has been intentionally roughened it may be referred to as a roughened surface. A rough contour is formed when a portion of the material is deposited along a roughened surface.

Therefore, by providing a means to reduce the average roughness of a component layer, the negative effect of roughened base, which is to create inefficient rough contours within material deposited onto it, is reduced. This reduction allows for components of similar efficiencies to their now roughened-contoured counterparts now enjoy the benefits of increased mechanical bonding as well as greater available surface energy.

It will be appreciated that the formation of the layer stack of the present invention may be achieved by: roughening an initial base layer; depositing a seed layer onto the initial base layer; creating a pattern for a series of pillars on the seed layer, the series of pillars having a first pillar and a last pillar; depositing pillars according to the pattern; removing the pattern; covering the first pillar and the last pillar with a protective covering while leaving the remaining pillars exposed; plating at least one layer of material onto the exposed pillars; covering all pillars in a protective covering so that the height of the covering exceeds the height of the pillars, creating a structure; grinding the structure down until an upper surface of each of the pillars is exposed, covering the exposed surface of the first pillar and the last pillar in the series of pillars with a protective covering while leaving the remaining pillars exposed, etching the exposed pillar and seed layer; removing the protective covering; and adding a build-up film.

In at least one exemplary embodiment, the result is a U-shaped material with an average surface roughness (Ra) of less than five microns. When roughening a semiconductor plastic base by sanding, surface peaks reach their highest at five microns, and therefore a component with a surface roughness of less than five microns is desirable.

As noted above, the U-shaped material may be a magnetic core component. However, it will be understood that core components may travel along a plane of the layer, and therefore the cross-section, not the full component shape, is u-shaped. A magnetic core component may be made of many materials, for example, but not limited to, nickel-iron, cobalt, or other ferromagnetic materials, including ferromagnetic materials and core compositions with non-magnetic additives.

These material component layers may be stacked to achieve multi-layer stacks of u-shaped component materials. The formation of such a stack may be achieved by further comprising repeating the steps of the initial layer stack formation, from depositing a seed layer onto the base layer through the adding of the build-up film, to form at least one additional layer on the prior formed layer with each newly formed layer now acting as the base layer for each directly subsequent layer.

It will be appreciated that in such cases where layers of core material are stacked, it is beneficial to reduce eddy current and fringe effects by offsetting the magnetic core material of each layer, and therefore, in the present invention, layers with core or conductive material may be offset.

It will also be appreciated to further reduce the potential interaction between core or conductive materials of each layer the layers may be separated. In at least one exemplary embodiment of the present invention, the layers are separated by a pillar extension that extends from the top of a base layer and upon which the subsequent layer is built. The layer extension allows for gaps within the layers, keeping the layers separated. These layer extensions may be formed on a component layer of the present invention by grinding down the build-up film to expose the first and last pillars, plating onto the first and last pillars a layer extension, and repeating the steps of depositing a seed layer onto the base layer through the adding of the build-up film, to form an additional layer, where the initial base is replaced with the layer extension, wherein the first and last pillars of each adjacent layer are connected by the layer extension and each layer, but for the layer extension, is spaced from the next layer.

Further other forms of separating layers may be included, for example, separating the layers of U-shaped components of the present invention with seed layers or other additional component layers as suitable for the purpose of the overall component.

Therefore, the u-shapes materials and the resulting layer stack of the present invention are suitable for multi-layer packaging and can serve to reduce the negative effects of utilizing a roughened base layer preserving the intended performance of a component, for example, an inductor, having a core of u-shaped materials.

DETAILED DESCRIPTION OF THE INVENTION

A system is provided that reduces the average roughness without increasing the required pathway length—resulting in layers that can achieve the benefit of mechanical bonding without significant sacrifice to performance loss. For example, in relation to a magnetic core, a series of U-shaped nickel-iron components are plated onto a semiconductor plastic in a manner that allows the U-shaped nickel-iron components to have a low average roughness. The lowered average roughness reduces the path length the U-shaped nickel-iron components provide for magnetic flux. The vertical surfaces of the U-shaped have a surface roughness comparable to dry film, while only the bottom surface of the U-shaped nickel-iron components presents a surface roughness matching that of the rough plastic they are plated on.

Figure 1:
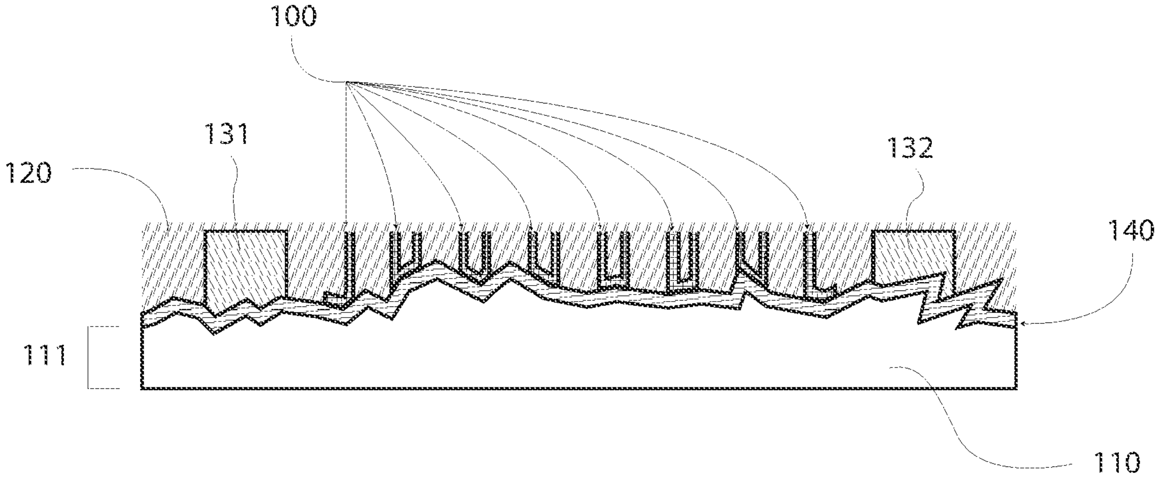
FIG. 1 is a perspective view of an exemplary embodiment of the present invention.

The result is shown in FIG. 1, where a series of U-shaped nickel-iron core components 100 are shown on a seed layer 140 which itself is on a roughened plastic base 110, which serves as an initial base layer 111 between the first pillars 131 and the last pillars 132. The U-shaped components 100 are encapsulated in semiconductor packaging 120.

Figure 2:
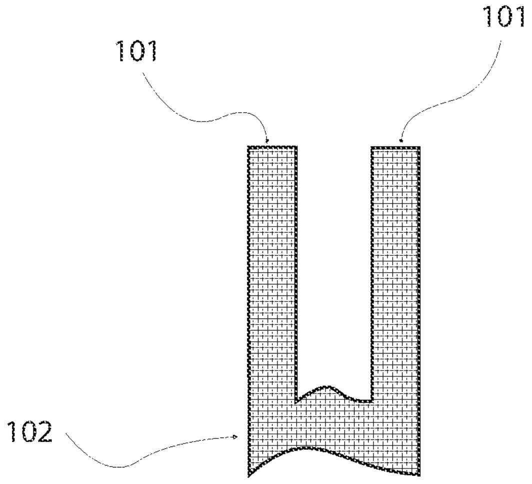
FIG. 2 is a perspective view of a material with a U-shaped cross-section of the present invention.

The U-shape components have two vertical portions 101 and a horizontal portion 102. The horizontal portion will typically contain the rough contour as shown in FIG. 2, where horizontal portion 102 is curved. However, a U-shaped component may be plated in a variety of configurations, and therefore whichever side or surface is aligned with a roughened base will have a rough contour. The U-shape refers to the component's cross-section at a given point.

Figure 3:
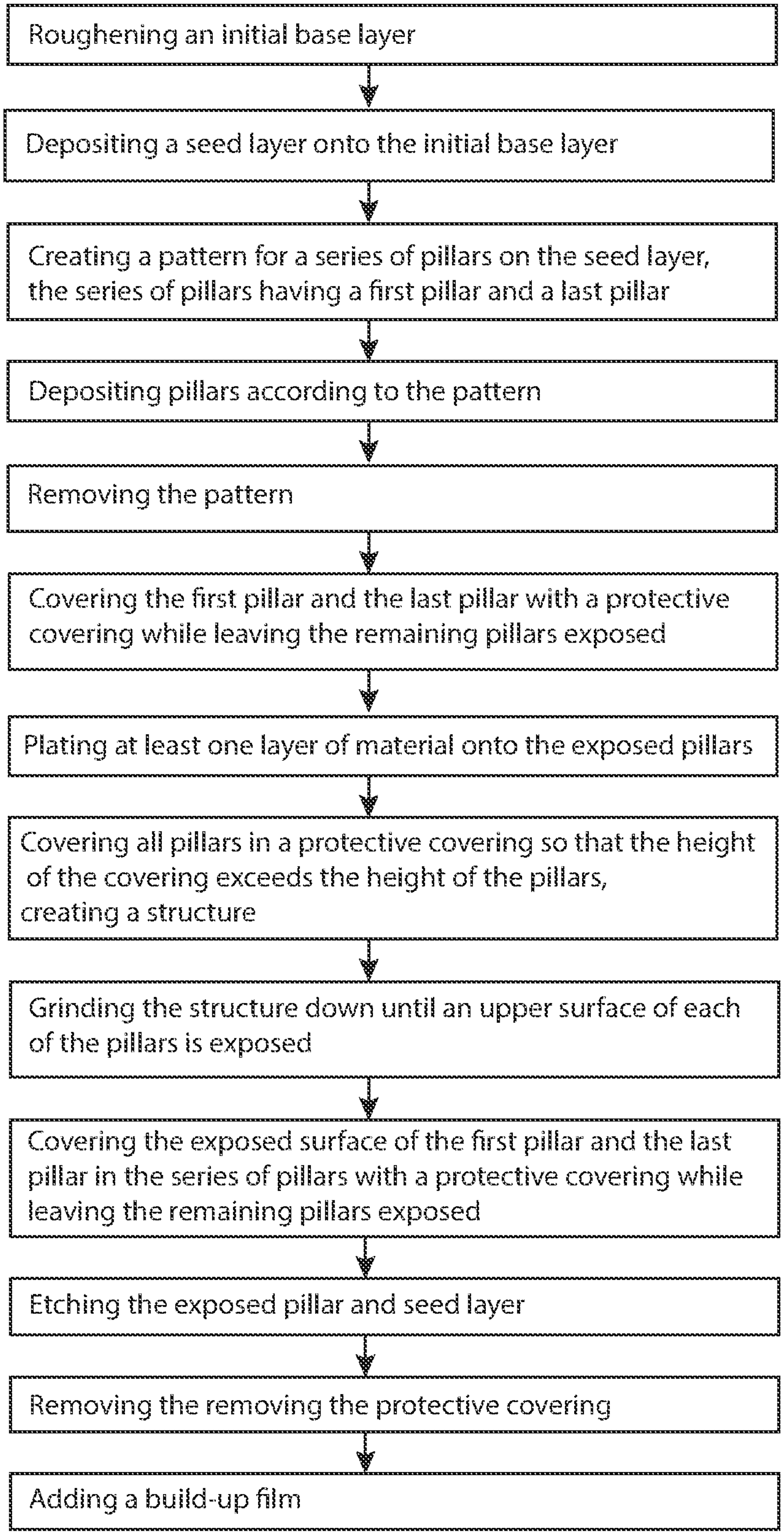
FIG. 3 is a flow chart of a method of the present invention.

FIG. 3 shows a flow chart of an exemplary embodiment of present invention having the steps of roughening an initial base layer, depositing a seed layer onto the initial base layer; creating a pattern for a series of pillars on the seed layer, the series of pillars having a first pillar and a last pillar; depositing pillars according to the pattern; removing the pattern; covering the first pillar and the last pillar with a protective covering while leaving the remaining pillars exposed; plating at least one layer of material onto the exposed pillars; covering all pillars in a protective covering so that the height of the covering exceeds the height of the pillars, creating a structure; grinding the structure down until an upper surface of each of the pillars is exposed; covering the exposed surface of the first pillar and the last pillar in the series of pillars with a protective covering while leaving the remaining pillars exposed; etching the exposed pillar and seed layer; removing the protective covering; and adding a build-up film. These steps will be further explained below. To provide an example of the formation of a layer stack of the present invention we return to our general example of nickel-iron core cross-sections. In this exemplary embodiment, to achieve a lower average roughness, first, a semiconductor plastic is mechanically pretreated, typically by sanding. This pretreatment will create a plastic surface with peaks, valleys, and overhangs, where the peaks can reach four to five micrometers off the bottom of the valleys.

A copper seed layer is then deposited onto the roughened surface of the plastic by electroless plating. The copper seed layer will serve as a seed layer that follows the contours of the plastic surface.

A dry film is placed onto the copper seed layer, and a series of copper pillars are patterned. The dry film process may be a negative or a positive process. In either process, the dry film is etched by light, presenting a smooth vertical surface in the patterning. The dry film patterning should provide at least two copper connector pillars for multi-layer packaging.

Copper pillars are then plated into the dry film pattern. The copper pillars' vertical surfaces will have a much lower average roughness than the horizontal surfaces. The bottom horizontal surface of the copper pillar will have an average surface roughness of the plastic underneath it. At the same time, the top horizontal surface will have a surface roughness not controlled by the dry film surfaces or plastic and thus be slightly rougher than the vertical surfaces but still far less rough than the bottom horizontal surfaces.

After the copper pillars are plated, the dry film overall non-connector pillars is removed, and nickel-iron is plated. The nickel-iron will follow the contours of the copper and take up the surface roughness of the copper beneath it. Therefore, the vertical surfaces of the nickel-iron will be extremely smooth compared to the plastic surface. The bottom surfaces of the nickel-iron will take the path of the plastic; however, due to the smoother vertical surfaces, the average roughness of the nickel-iron components is reduced.

Once the nickel iron is plated, a dry film is placed to cover all the nickel iron. The dry film can be vacuumed-sealed or rolled into the gaps between the pillars. Once the dry film is placed, a grinding process occurs so that the entire structure is ground down to a level exposing the upper horizontal surfaces of the copper pillars under the nickel-iron. This grinding process leaves the nickel-iron in a series of repeating U-shapes by exposing the upper surface of the copper pillars.

The copper pillars, but for the connector pillars, are then etched out, and any remaining dry film is removed. Ajinomoto Black Build-up Film is then added to complete the layer.

It will be appreciated that further layers can be made using the same process but built upon the initial layer instead of the roughened plastic. When the layers are built directly on each other, the U-shaped nickel-iron components are to be offset in every layer to avoid creating nickel-iron loops, as nickel-iron loops generate strong eddy currents, which would reduce the performance of the system. These layers may also include other components or packaging layers between each layer as is suited or dictated by the best practices of forming the overall component (for example, an integrated inductor).

Further layers can also be created with a gap in-between the layers by extending the copper connector pillars above the initial layer and then using the extension to connect the layer. When this occurs, the U-shaped nickel-iron components need not be offset because the gap prevents a loop from forming. However, this takes up more space than stacking the layers directly on each other.

Now, more specifically, we shall approach the steps of the present invention in greater detail.

Figure 4:
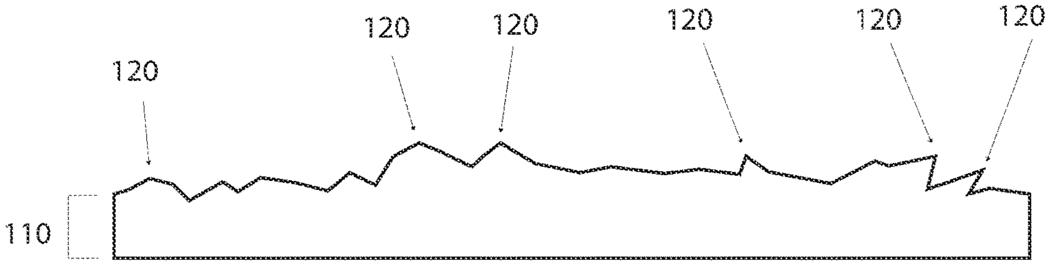
FIG. 4 is a perspective view of the base layer of the present invention.

FIG. 4 shows a roughened base 110 with peaks 121. The roughened base 110 may be a variety of materials, and in at least one exemplary embodiment is a semiconductor plastic, for example, an epoxy plastic or a glass bead embedded epoxy plastic which includes Ajinomoto build-up film as noted above. The roughening may occur by sanding, grinding, or other roughening means including, but not limited to, chemical means. It has been found useful to roughen the surface of plastic so that the highest peaks 121 are between 3 and 5 microns in height. However, of course, a variety of peak heights may be produced.

Figure 5:
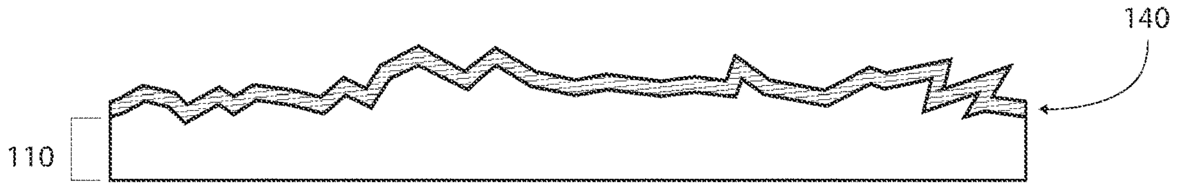
FIG. 5 is a perspective view of a base layer with a seed layer deposited onto it.

FIG. 5 shows the application of a seed layer 140; although not strictly necessary, a seed layer will allow a stronger bond between the component layer and the roughened base 110. The seed layer 140 follows the contours of the roughened base 110. It is worth noting that the figures are not too large and the relative thickness of the seed layer 140 has been increased to allow it to be seen. The seed layer will help enable the use of pillars to produce the vertical surfaces 101 of the U-shapes 100 (not shown).

Figure 6:
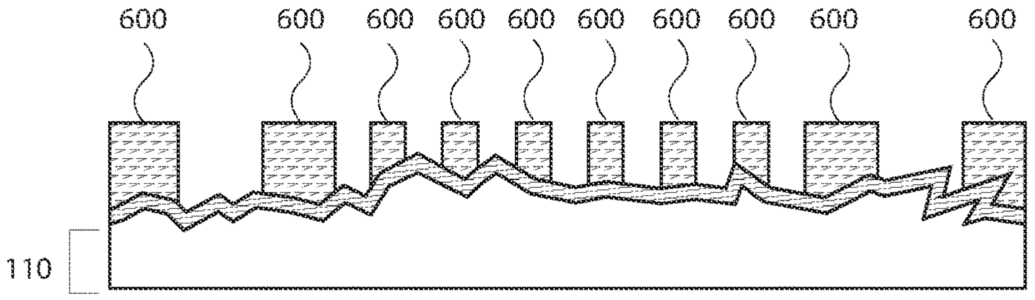
FIG. 6 is a perspective view of a pattern for pillars placed onto the stack of FIG. 5

When the base layer 110 is ready to receive the component layer, here referring to a layer of U-shaped component material, a pattern of pillars is to be produced. FIG. 6 shows a dry film 600 forming a pattern for pillars on the base layer 110. When used, the vertical dry film walls will set the smoothness for the vertical portions of the u-shaped components. This occurs as the dry film transfers the smoothness to the pillar walls, and as will be seen, this smoothness is then passed onto the U-shaped component.

Figure 7:
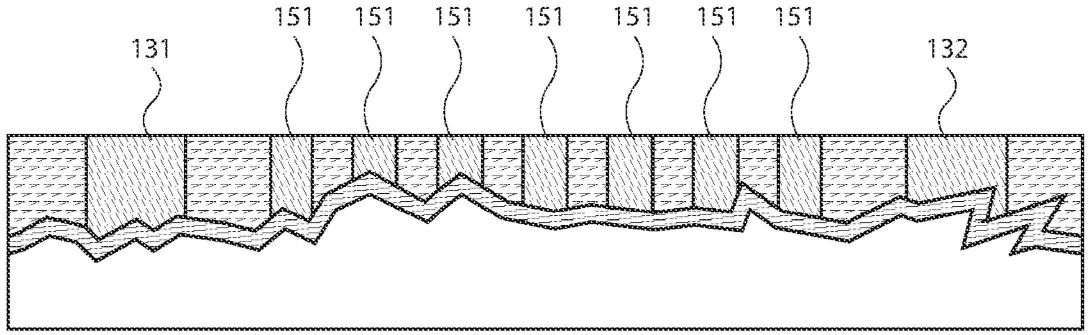
FIG. 7 is a perspective view of pillars placed according to the pattern of FIG. 6

FIG. 7 shows the formation of pillars 151. These pillars 151 provide structural support to form the u-shaped cores, and in at least one exemplary embodiment, the first pillar 131 and the last pillar 132 will also provide electrical connections to other layers. As such, the first pillar 131, and the last pillar 132 may be larger than the other pillars. However, it is worth noting that any pillar 151 could be kept and used to provide electrical connections across layers.

One material that is useful for forming the pillars is copper, which enables strong electrical connections. However, many different pillar materials may be used, especially for those pillars, which will only be utilized for structural support during the component layer formation to reduce costs.

Figure 8A:
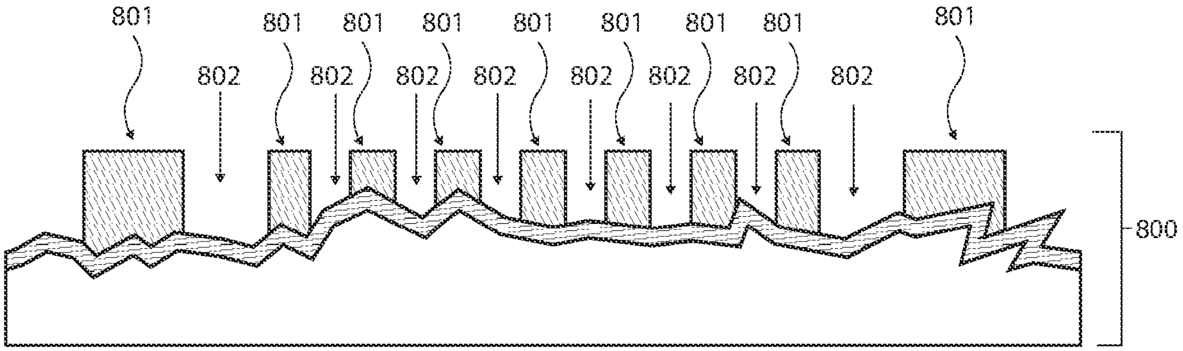
FIGS. 8*a* and 8*b* are a perspective view of the layer stack of FIG. 7, with the patterning material removed.
Figure 8B:
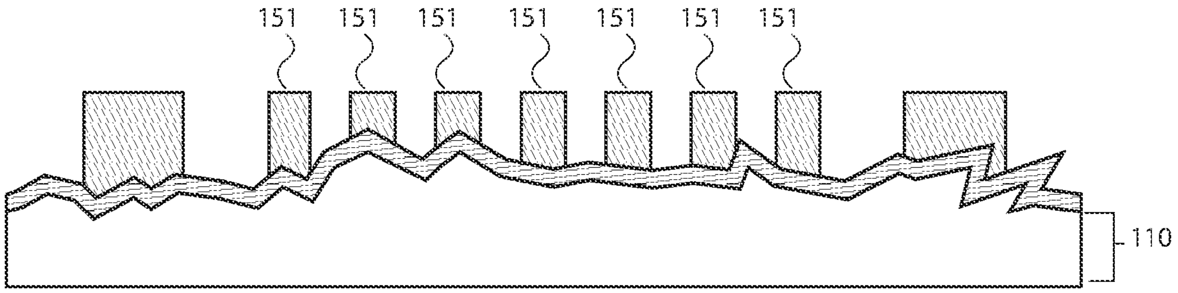

Once the pillars have been formed, the dry film is removed, as shown in FIGS. 8*a* and 8*b*. It is worth noting that at this point, the upper surface of stack 800 appears as a series of peaks 801 and valleys 802; the valleys have a roughened base that follows the contours of base 110. The vertical portions of pillars 151 have a smoothness and straightness, which is essentially equivalent to the straightness and smoothness of the pattern used to form pillars 151. When a dry film is used, the pattern is formed by light during the patterning process, and thus the edges of the film are much smoother than the plastic surfaces.

Figure 9:
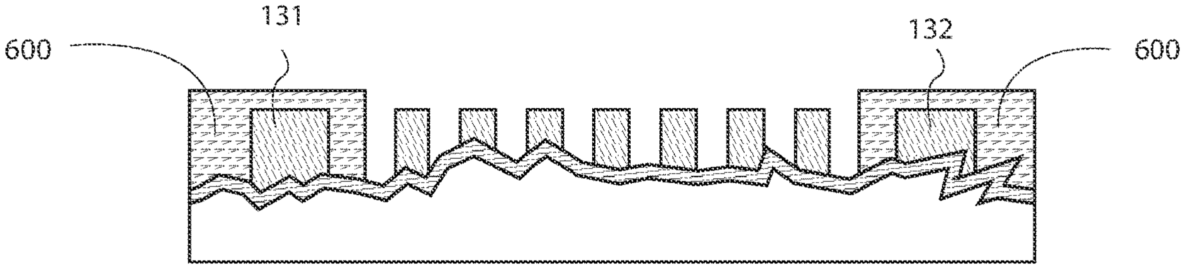
FIG. 9 is a perspective view of the layer stack of FIGS. 8*a* and 8*b* now having a patterning material over the first and last pillars.

When the material which will form the U-shaped components is placed it will follow the surface contours of the stack 800 and take up the smoothness of the vertical portions and the roughness of the base for the horizontal portions. Before placing the material, which will become the UI-shaped components it is good to cover the pillars, which will become the electrical connections to other layers, with a dry film or other protective covering to prevent the material from plating onto the electrical connection pillars. This can be seen in FIG. 9, which shows a dry film 600 covering the first pillar 131 and the last pillar 132, which in the example shown will become the electrical connections to subsequent layers. It is worth noting that if no electrical connections are needed these pillars need not be preserved.

Figure 10:
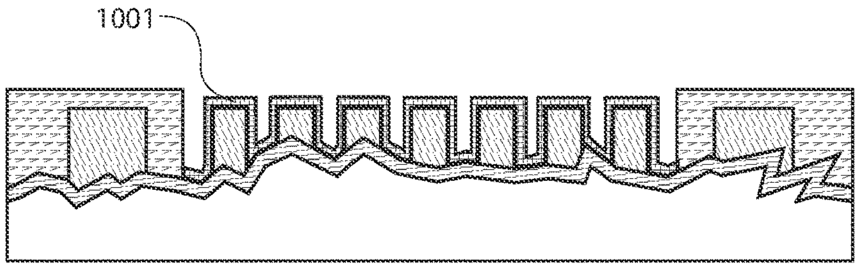
FIG. 10 is the layer stack of FIG. 9 now having a material placed over the stack of FIG. 9
Figure 11:
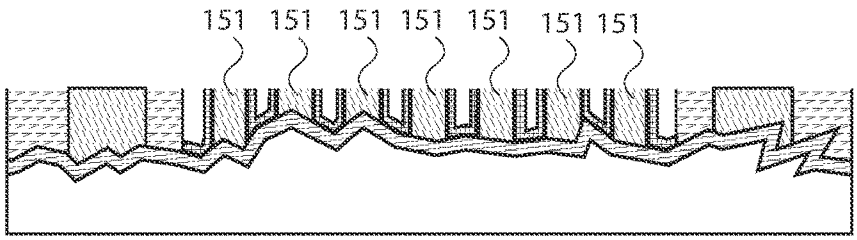
FIG. 11 is a perspective view of the stack of FIG. 10, now ground down to expose the pillars

As shown in FIG. 10, the material which will form the U-shapes has been placed there to form what appears as a square wave of material 1001. This material 10001, has taken up the contours of the surfaces upon which it has been plated. Once the plating is complete the material will be ground down to expose pillars upon which it rests. This ground-down state is shown in FIG. 11, where pillars 151 are now exposed.

This grinding step has also separated the material 1001 into a series of U-Shapes 100. It can be seen that there are two L-shapes 105 of material as well. These L-shapes 155 were formed by the dry film 150 used to protect the first 151 and last pillars 152. By patterning a variety of shapes, many forms of material can be produced.

Figure 12:
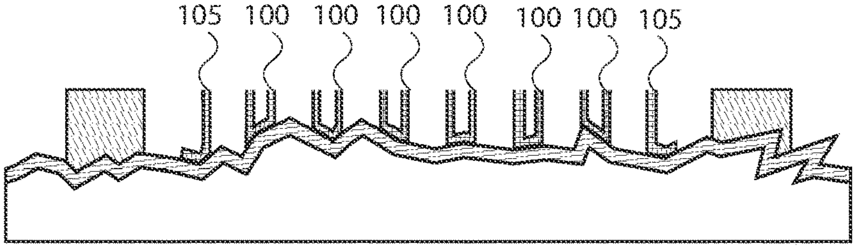
FIG. 12 is a perspective view of the stack of FIG. 11 with the pillars, except for the first and last pillars, and the pattern material removed.

Once the grinding step is completed, the pillars are removed. In at least one exemplary embodiment, when copper pillars have been used, the pillars are removed by etching. As shown in FIG. 12, this leaves a layer of unsupported U-shape components 100. To support the components and complete the layer, a build-up film may be added, as shown in FIG. 1, where semiconductor packaging material, shown here as build-up film, 120 now covers the U-shaped components 100.

The result is a U-shaped component which, although it does absorb the base layer roughness, has its average roughness reduced by the vertical portions 101 of the U-shape.

Figure 13:
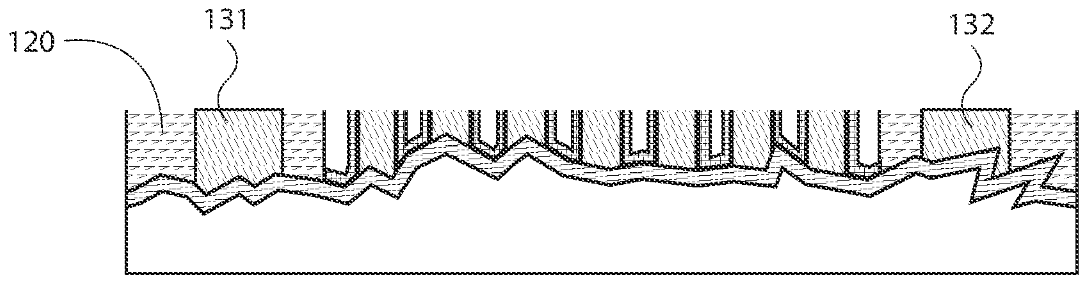
FIG. 13 is a perspective view of the stack of FIG. 12 with the stack now encapsulated in build-up film.

When a multi-layer package is desired, the upper surface of stack 180 may be ground down to expose the first pillar 131 and the last pillar 132, as shown in FIG. 13. Subsequent layers may now be built with this layer now serving as a smooth base for additional layers. The additional layers may vary but also may include further U-shaped layers.

Figure 14:
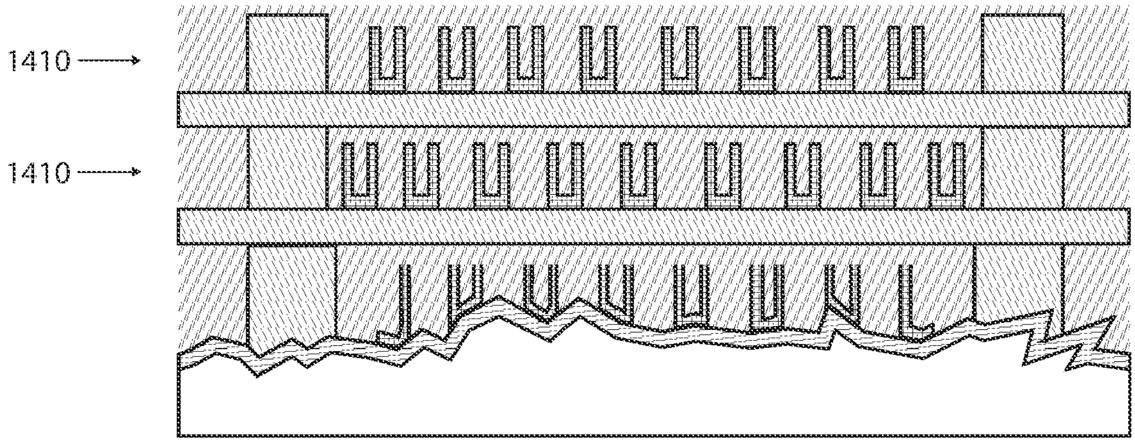
FIG. 14 is a perspective view of a multi-layer embodiment of the present invention where the U-shapes are offset, and there is a seed layer between each U-shape layer.

Additional layers containing U-shape components are shown in FIG. 14, These additional layers 1410 have been built directly on top of the initial U-shaped components layer using the same process as the initial layer. In at least one exemplary embodiment, as shown, the U-shapes of each layer are offset to avoid creating a loop, as the loop would create strong eddy currents and reduce the system's performance, as would occur, for example, with a nickel-iron loop.

Figure 15:
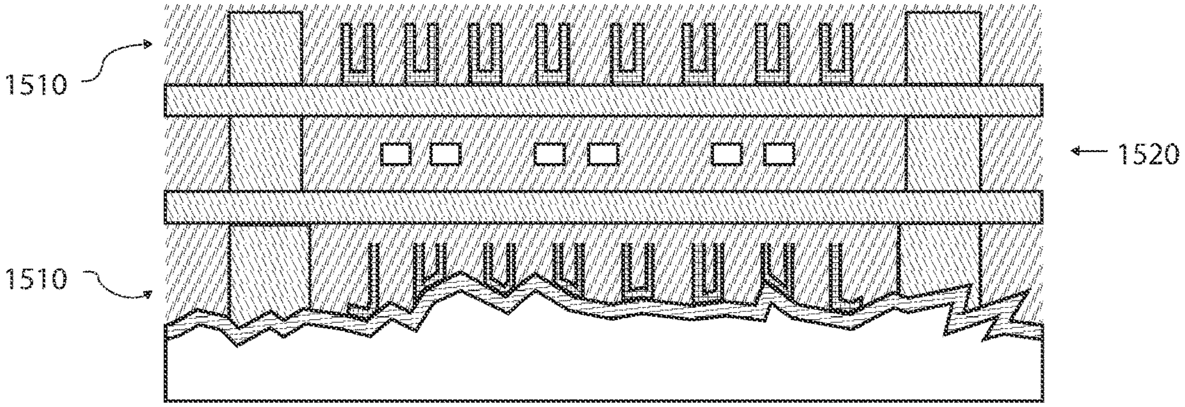
FIG. 15 is a perspective view of a multi-layer stack where the multi-layer stack contains a layer that does not contain a U-shaped material.

As noted above, additional layers may be interspersed with the U-shaped component layers. One such layer stack 1500 is shown in FIG. 15. Where two layers 1510 containing U-shaped components are separated by an alternate package layer 1520.

Figure 16:
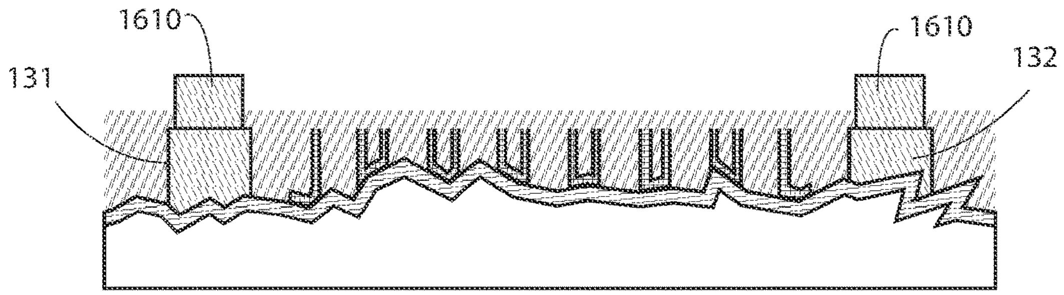
FIG. 16 is a perspective view of the stack of FIG. 13, where the first and last pillars now have a layer extension operably extending the pillars beyond the height of the rest of the layer.
Figure 17:
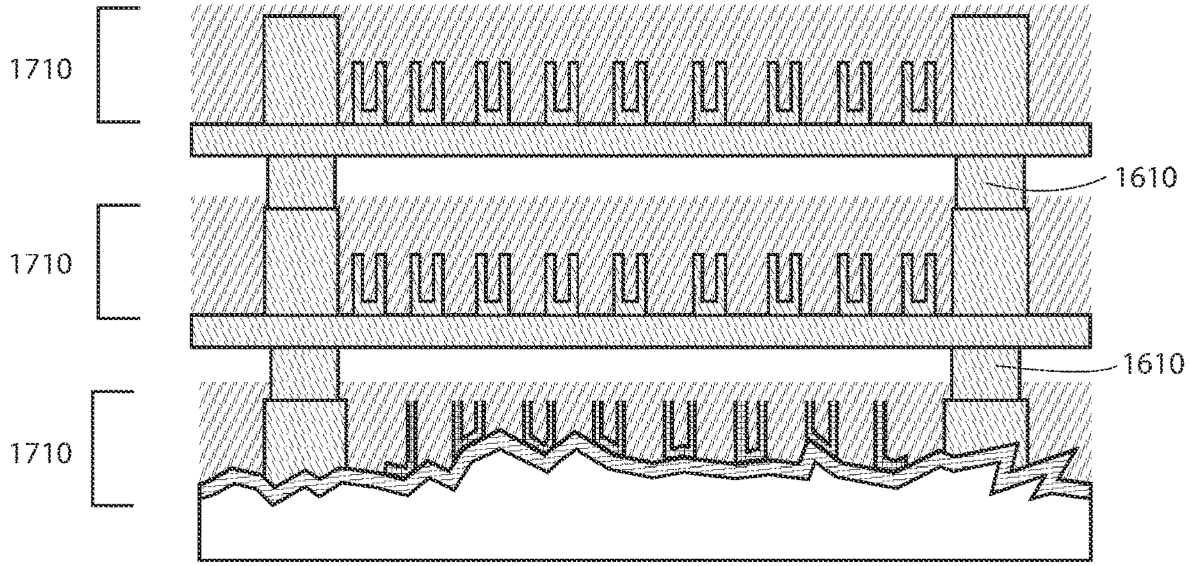
FIG. 17 is a perspective view of a multi-layer embodiment of the present invention where the layers containing U-shapes are separated by an empty space created by layer extensions.

To further reduce parasitic eddy currents, when utilizing additional layers with u-shaped components, a space can be created between the layers. As shown in FIG. 16, the space is created by first plating an extension 1610 onto the electrical connection pillars (here 131 and 132) and then forming the subsequent layer on the layer extension. It is worth noting that when each layer is encapsulated by plastic before building the next layer, the plastic may be roughened, and the next layer built accordingly, as shown in FIG. 17 wherein the layers 1710 are separated by extensions 1610.

As demonstrated above, the result of the present invention is a layer stack that operates efficiently even though it has a roughened base as the initial U-shape component layer absorbs the roughness. The roughness, in turn, allows for greater physical and mechanical bonding to occur, strengthening the layer stack significantly.

The drawings and figures show multiple embodiments and are intended to be descriptive of particular embodiments but not limited with regard to the scope or number, or style of the embodiments of the invention. The invention may incorporate a myriad of styles and particular embodiments. All figures are prototypes and rough drawings: the final products may be more refined by one of skill in the art. Nothing should be construed as critical or essential unless explicitly described as such. Also, the articles "a" and "an" may be understood as "one or more." Where only one item is intended, the term "one" or other similar language is used. Also, the terms "has," "have," "having," or the like are intended to be open-ended terms.

I claim:

1. A component material layer stack, comprising: a magnetic core material with a U-shape cross-section, a portion of an outer surface of the magnetic core material with a U-shape cross-section having a rough contoured surface, the rough contoured surface of the magnetic core material operably bonded to a roughened portion of a base layer.

2. The component material layer stack of claim 1, wherein the rough contoured surface of the magnetic core material with a U-shape cross-section is operably bonded to the rough portion of the base layer by utilization of an intermediary seed.

3. The component material layer stack of claim 1, further comprising a semiconductor packaging encapsulating the magnetic core material with a U-shape cross-section.

4. The component material layer stack of claim 1, wherein an average total surface roughness Ra of the magnetic core material with a U-shape cross-section is less than 5 microns.

5. The component material layer stack of claim 1, wherein the magnetic core material with a U-shape cross-section is nickel-iron.

6. The component material layer stack of claim 1, further comprising at least one additional layer of magnetic core material with a U-shaped cross-section arranged in a vertical stack on the magnetic core material with a U-shape cross-section.

7. The component material layer stack of claim 6, wherein a first and a last pillar of each at least one additional layer of magnetic core material with a U-shaped cross-section are operationally connected to a first pillar and a last pillar, respectively, of an adjacent layer of magnetic core material with a U-shaped cross section.

8. The component material layer stack of claim 7, wherein each at least one additional layer of magnetic core material with a U-shaped cross-section is operably separated from the adjacent layer by a seed layer.

9. The component material layer stack of claim 8, wherein each at least one additional layer of magnetic core material with a U-shaped cross-section is operably separated from the adjacent layer by an additional component layer.

* * * * *